United States Patent Office 3,158,022
Patented Nov. 24, 1964

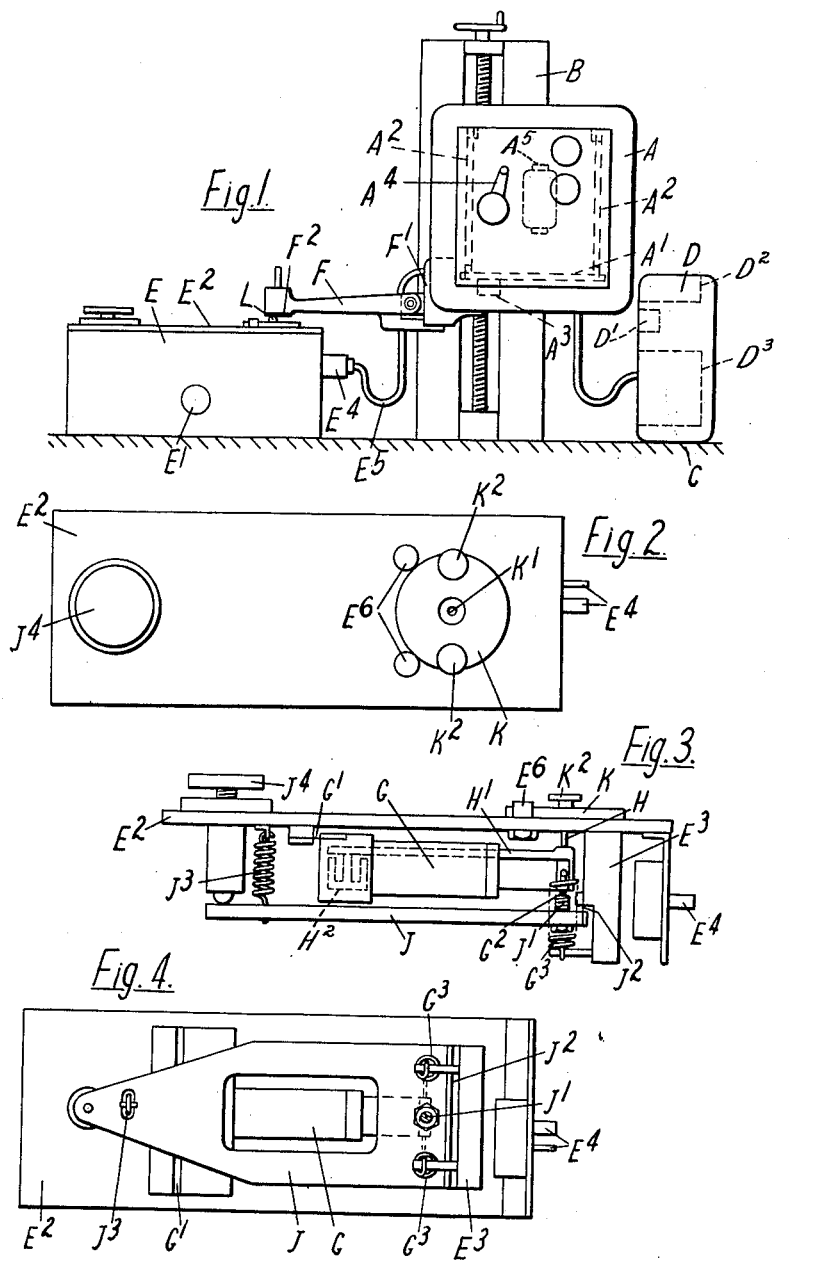

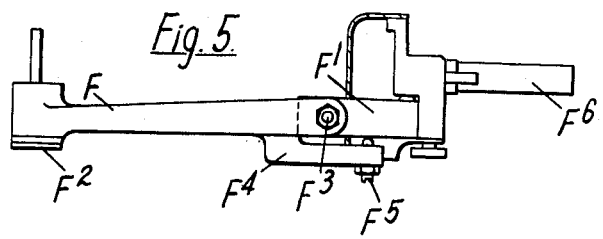
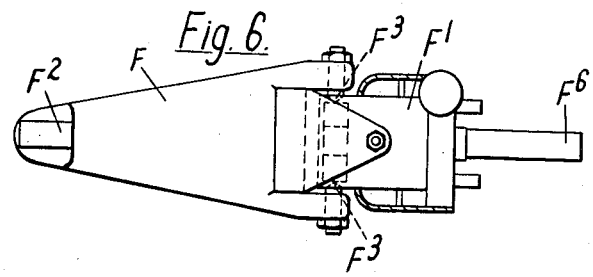
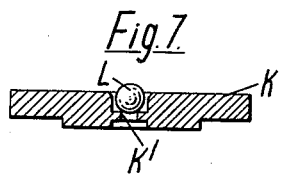
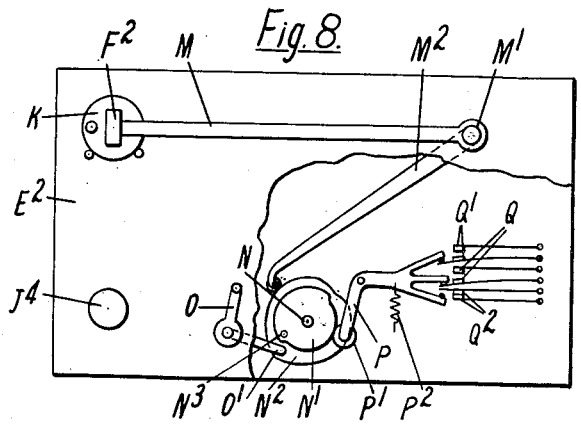

3,158,022
APPARATUS FOR MEASURING OR INDICATING SURFACE ROUGHNESS
George Ormerod Rawstron and Thomas William Clifford, Leicester, England, assignors to Rank Precision Industries Limited, trading as The Rank Organisation Rank Taylor Hobson Division, Leicester, England, a British company
Filed Apr. 19, 1961, Ser. No. 104,125
Claims priority, application Great Britain, Apr. 20, 1960, 13,830/60
5 Claims. (Cl. 73—105)

This invention relates to apparatus for measuring or indicating the roughness of a surface of a body and is especially concerned with testing a surface of revolution of small radius, such for example as the surfaces of small balls or rollers of the kind employed in ball or roller bearings.

Surfaces of revolution are usually tested either by traversing a stylus along an arcuate path of the appropriate radius by means of a radius link to engage with the surface to be tested, or by mounting the body to be tested on an accurate spindle so that its surface can be traversed past a stationary stylus, the working movements of the stylus due to the roughness of the surface during such relative traversing, in either case, being caused to actuate a transducer which electrically controls a measuring or indicating instrument. The most useful indication of surface roughness can be obtained with an integrating meter, the relative traversing being effected at a constant known speed over a chosen path length, so that the meter gives an indication of the average roughness of the surface in accordance with a standard scale. Alternatively, a magnified record of the individual peaks and hollows of the surface can be obtained on a chart by means of a recording instrument energized through appropriate amplifiers.

The use of a radius link for traversing the stylus presents serious difficulties when the radii of the surfaces to be tested are small, not only in regard to the adjustment of the length of the radius link accurately to the correct values, but also in regard to the accurate relative positioning of the body to be tested and the axis of rotation of the radius link.

In the alternative case of mounting the body on a spindle for rotation past the stylus, the centering difficulty again arises and there is in addition a further difficulty in regard to the speed of movement of the surface. Thus, for obtaining average roughness readings, it is necessary to ensure the correct surface speed, and owing to the wide range of different sizes of balls and rollers to be tested, including very small sizes, a very considerable range of variations of spindle speed is required.

The present invention has for its object to provide a simple and efficient apparatus for testing surfaces of small radius wherein such difficulties are obviated. The apparatus may be in the form of an attachment to an existing apparatus for measuring or indicating the roughness of surfaces of other types, or may be complete in itself.

The apparatus according to the present invention comprises a supporting framework, a plate detachably mounted on the framework and having an orifice of a size and shape to provide a seating for the body whose surface is to be tested whereby a portion of such surface is exposed through the orifice to the reverse side of the plate, a stylus for engaging with such exposed portion of the test surface, a friction pad engaging with the surface of the test body, means for driving the friction pad to cause it to exert a frictional force for rotating the test body on its seating whereby a circular section of the test surface is traversed past the stylus and the stylus is thereby caused to perform small working movements in an approximately radial direction with respect to the axis of rotation of the body in accordance with the roughness of the surface, and a pick-up head carried by the framework and serving to carry the stylus and also a transducer responsive to the working movements of the stylus for electrically controlling a measuring or indicating instrument.

Conveniently, the pick-up head is pivoted to the supporting framework and carries an abutment engaging with a stop which is adjustably mounted on the framework and constitutes a reference datum for the working movements of the stylus. Fine adjustment of such stop may be effected by a micrometer screw through a lever pivoted to the framework and having a large reduction ratio.

The supporting framework may conveniently be constituted by a box housing the pick-up head and having a top-plate on which the plate containing the seating orifice can rest, stops being provided on the top-plate for accurately locating the plate in its operative position.

The friction pad may be carried on the end of an arm pivoted to a member which is driven in a direction generally corresponding to the length of the arm. Such an arrangement is especially convenient when the apparatus according to the invention is in the form of an attachment to existing apparatus for measuring or indicating the roughness of surfaces of other types, wherein a substitute pick-up head is driven at constant speed by suitable traversing mechanism housed in a gear box whose height is adjustable on a column upstanding from a base on which a work support carrying the object whose surface is to be tested is mounted. In such case, the main pick-up head is detached from the existing apparatus and the arm carrying the friction pad connected in its place to the traversing drive, whilst the box carrying the substitute pick-up head and the orificed plate is mounted on the base of the existing apparatus in place of the work support.

The invention may be carried into practice in various ways, but a preferred practical arrangement according thereto is illustrated by way of example in the accompanying drawings, in which FIGURE 1 is a general view of the preferred arrangement, which is intended for use as an attachment to existing surface testing apparatus of general applicability, FIGURES 2, 3 and 4 illustrate on a larger scale the top plate of a pick-up box forming part of the attachment, FIGURE 2 being a plan view, FIGURE 3 a side elevation and FIGURE 4 an under plan view thereof, FIGURES 5 and 6 illustrate respectively a side elevation and an underplan view of a traversing unit forming part of the attachment, FIGURE 7 illustrates on a still larger scale one of a set of interchangeable ball-carrying plates for use on the pick-up box, and FIGURE 8 is a diagrammatic view of an alternative arrangement in the form of a complete testing unit, instead of as an attachment to existing apparatus.

In FIGURE 1, the preferred attachment according to the invention is shown in position attached to one known form of surface testing apparatus, of the kind in which a main pick-up head for surface testing is traversed over a surface to be tested by means of a traversing mechanism housed within a gear box A (of the kind described in British patent specification No. 675,488) adjustably mounted on a vertical column B upstanding from a base C to which a work support is clamped. The main pick-up head and the work support of the existing apparatus are not shown in the drawings, since they are removed when the attachment according to the present invention is to be used.

The main pick-up head of the existing apparatus is pivotally supported on a member detachably coupled to a traversing bar (diagrammatically indicated at A¹) housed in the bottom portion of the gear box A, and carries a rounded skid which can slide on the surface to be tested, and a sharp main stylus also engaging with such surface adjacent to the skid is mounted on the end of an arm pivoted to the main pick-up head, such arm cooperating with a maintransducer, which is thus responsive to the working movements of the main stylus relative to the skid as the main pick-up head is traversed along the surface.

The traversing bar $A^1$ is suspended from the upper part of the gear box A by a parallel-motion linkage consisting of a pair of long arms (indicated at $A^2$), so as to move approximately along a straight line path, along which it is driven at constant speed through suitable mechanism from an electric motor (indicated at $A^5$) housed in the gear box. The traversing bar $A^1$ carries a socket (indicated at $A^3$) into which a plug on the member carrying the pick-up head engages. The driving mechanism in the gear box also serves to operate in timed sequence electric switches (not shown) controlling the supply of energising current to the electric motor $A^5$ and also the electrical connection from the transducer through a cable to a separate casing D containing an amplifying circuit leading to an integrating meter (indicated at $D^1$) (or alternatively to a pen recorder) (indicated at $D^2$) and also the power unit therefor, the amplifying circuit and the power unit being housed at the bottom of the casing D (as diagrammatically indicated at $D^3$). A starting lever $A^4$ on the gear box A likewise controls electric switches, and an operation of the lever the traversing member $A^1$ is first returned to its starting position and the motor $A^5$ is started up to drive such member in the forward direction for effecting the traversing. As soon as the motor has got up to speed a switch is operated to complete the connection to the integrating meter $D^1$. After a predetermined length of traverse of the stylus over the test surface, switches are operated to disconnect the transducer from the integrating meter $D^1$ and to stop the motor. The reading on the integrating meter thus gives an indication of the average roughness of the surface during the traverse, and it should be mentioned that another operation performed by the starting lever initially is to operate a switch for resetting the meter to zero in readiness for a new traverse.

It has been assumed, for simplicity, in this description that the surface to be tested is flat. The test body having the surface under test is suitably supported on a work support clamped to a T-slot in the base C of the apparatus.

The preferred construction according to the present invention consists of an attachment for such existing apparatus formed in two parts. One part consists of a box E which is clamped to the T-slot in the base C of the apparatus under the control of a clamping knob $E^1$, the work support having been removed, and the other part consists of an arm pivoted to a member $F^1$, which is coupled to the traversing bar $A^1$ in the gear box A in place of the normal pick-up head.

The box E has a top-plate $E^2$ (shown in detail in FIGURES 2, 3 and 4) to the underside of which a substitute pick-up head G is pivoted by means of a ligament hinge $G^1$. A substitute stylus arm $H^1$ is pivoted to this substitute pick-up head G so as to cooperate with an electromagnetic substitute transducer (diagrammatically indicated at $H^2$) in the head, the substitute stylus H on the end of the arm $H^1$ being spring-urged upwardly to project through an opening in the top-plate $E^2$. The substitute pick-up head G is also provided, directly beneath the substitute stylus H, with a projection $G^2$ which rests on an adjustable stop in the form of an adjusting screw $J^1$ in a lever J, which is pivoted on a ligament hinge $J^2$ to a bracket $E^3$ fixed to the underside of the top-plate $E^2$, springs $G^3$ being provided for urging the substitute pick-up head into engagement with the stop $J^1$. The hinge $J^2$ of this lever J is relatively close to the stop $J^1$ and the lever extends from the hinge past the stop to near the other end of the box, where it is spring-urged at $J^3$ against the actuating end of a micrometer screw $J^4$ carried by the top plate $E^2$. It will be clear that this arrangement provides not only coarse adjustment for the position of the pick-up head afforded by the adjusting screw $J^1$ in the lever J, but also a fine adjustment therefor afforded by the micrometer screw $J^4$ acting through the relatively large reduction ratio of the lever J.

The electrical connections from the substitute transducer $H^2$ are taken to socket terminals indicated at $E^4$ on the end of the box, so that a cable $E^5$ can be plugged into such terminals leading to the electrical circuit in the gear box A of the existing apparatus from the main pick-up head thereof to the electrical switches which control the connections to the amplifier and integrating meter.

The top-plate $E^2$ of the box E also serves to receive on its upper surface, adjacent to the hole through which the substitute stylus H projects, any one of a number of interchangeable circular plates K. Each of these plates K (see FIGURE 7) has a central orifice $K^1$ which constitutes a seating for receiving the ball or roller or other body having a surface of revolution to be tested, the seating being appropriately shaped to receive the body. Thus, for instance, in the case of a ball, the seating would consist of an open-ended conical surface or (as shown) of the burnished edge of a circular hole $K^1$ drilled through the plate or of a three-point support for the ball, the seating being formed to offer very small resistance to rotation of the ball therein. In the case of a cylindrical roller, the seating would consist of an open V-slot or of a pair of burnished parallel edges or a four-point support, whilst for a body other than a ball or cylindrical roller the seating would be suitably shaped to receive the body and to permit rotation about the axis of symmetry of its surface. The size of the seating is such as to permit the surfaces of the ball or roller or other body to be exposed beneath the seating with its lowermost point in a predetermined position for engagement by the stylus. A subtended angle of about 90 degrees at the axis of the ball or roller or other body from the points of support at the seating will usually be satisfactory. In order to position the circular plate K accurately for such engagement, the top-plate $E^2$ carries a pair of stop pins $E^6$ against which the edge of the plate K abuts, the plate in this operative position being clamped to the top-plate by two clamping screws $K^2$ loosely passing through their holes in the plate K.

The arm F, which replaces the main pick-up head of the existing apparatus, extends from the gear box A over the top-plate $E^2$ of the box and carries at its end a friction pad $F^2$ of appropriate length, this pad in operation resting on the top of the ball or roller or other body under test. The pivot for this arm F may conveniently consist of a pair of centres $F^3$ engaging with the sides of the member $F^1$ coupled to the traversing bar $A^1$, the arm carrying a projection $F^4$ having an adjustable stop $F^5$ which engages with the underside of such member $F^1$ to hold the arm in an appropriate lowermost position. The member $F^1$ carries a plug $F^6$ fitting into the socket $A^3$ on the traversing bar $A^1$. The weight of the arm F is sufficient to hold the friction pad $F^2$ firmly in frictional engagement with the top of the ball or roller or other body, so as to cause such body to rotate in its seating so that a circular section of the surface will be traversed past the stylus H when the friction pad is traversed by the operation of the traversing mechanism in the gear box. Care must of course be taken to ensure that the circular plate K is in its correct orientation, when a roller or other body is to be tested, so that the friction drive is exerted in a direction at right angles to the axis of the body.

In operation, when the ball or roller or other body (indicated at L in FIGURES 1 and 7) has been placed on its seating in the circular plate K on the top-plate $E^2$, any necessary adjustment of the position of the substitute pick-up head G is made to compensate for any slight error in the positioning of the test body and to ensure proper engagement of the substitute stylus H with the correct contact pressure on the lower surface of the body. The starting lever A⁴ on the gear box A is then operated to bring the friction pad F² to its starting position and to start up the motor A⁵. After an appropriate time sufficient to ensure that the speed of the friction pad has risen to the desired value, the switches in the gear box connect up the substitute transducer H² through the amplifier to the integrating meter D¹ and the traverse proceeds through the chosen length, the friction pad F² imparting a constant speed of drive to rotate the ball L or roller or other body in its seating. Since the pad F² and the substitute stylus H engage with opposite ends of a diameter of the body L, it will be clear that the surface of the body is traversed past the stylus at exactly the same speed as that of the friction pad, whatever the size of the body may be. Provided that the seating in the circular disc K is satisfactorily formed and polished, the risk of slip in the drive is minimised by the choice of suitable material for the friction pad. It is found that ordinary relatively hard rubber is fully satisfactory for the purpose.

In order to check whether any slip is taking place between the friction pad F² and the test body L (which would affect the accuracy of the meter reading), the pen recorder D² may be substituted for the integrating meter D¹ and a trace taken of the contour of the surface. If repeated traverses of the friction pad produce identical graphs, it is clear that no slip is taking place between the friction pad and the test body.

It will be apparent that the apparatus according to the invention may be formed as a complete unit in itself, instead of as an attachment to existing apparatus, by incorporating in an extension of the box, containing the pick-up head, the necessary mechanism for effecting the traversing of the friction pad and the control devices therefor. One such arrangement is shown diagrammatically in FIGURE 8.

In this arrangement, the extended box contains the pick-up head, mounted beneath the top-plate E² as in the arrangement described above, but the friction pad F² is mounted on the end of a long arm M rotatable about a vertical shaft M¹ mounted in the box E at the end thereof remote from the pick-up head, so that the pad will move along an approximation to a straight path, constituted by a short arc of a circle of large radius. Part of the top-plate E² is broken away in FIGURE 8 to show the mechanism. The traversing of the friction pad is effected from a motor (not shown) which drives a cam shaft N at relatively slow speed, a heart-shaped cam N² on this shaft being utilised to drive a crank arm M² carried by the shaft M¹. The cam shaft N performs a complete revolution for each traversing and resetting cycle and carries a cam N¹ which serves, in conjunction with the starting lever O, mounted on the top-plate E², for the operation of the necessary electrical switches.

These switches, in the example illustrated, are in the form of three spring-contact pairs, operated by a forked lever P carrying a roller P¹ pressed by a spring P² into engagement with the cam N¹. The normally open contact pair Q controls the energisation of the driving motor, whilst the other two contact pairs Q¹ and Q² control the integrating meter circuit, the pair Q¹ being normally open and the pair Q² normally closed. The cam N¹ also carries a pin N³, which lies in the path of an arm O¹ carried by the starting lever O.

Thus, in order to perform an indicating or measuring operation, the starting lever O is moved by hand to its operative position, thus causing the arm O¹ to engage the pin N³ and thereby to rotate the cam N sufficiently to bring the roller P¹ out of the small cam depression, in which it engages in the normal rest position. This moves the lever P sufficiently to close the motor switch Q, whereupon the motor starts up and begins to drive the cam N, when the starting lever O can be released to return to its normal rest position. After rotation of the cam through about 90 degrees, the roller P is moved further out and thereby causes the contact pair Q¹ to close and the contact pair Q² to open. This prepares the integrating meter to receive the signals in accordance with the stylus movements, the meter being at the same time reset to the zero position. The operative measuring cycle now begins, the friction pad F² being driven in the forward direction to rotate the ball under test. This continues until the cam has been rotated through about 225 degrees, when it operates the roller P to reopen the contact pair Q¹, thus cutting the integrating meter off so that it indicates an integration of the stylus movements during the traverse. The closing of the contact pair Q² short-circuits the meter, which thus remains set at the recorded reading. Further rotation of the cam N brings it again to its starting position, in which the roller P moves to open the contact pair Q and stop the motor. During the cam rotation, the friction pad F² will have been slowly traversed at a substantially uniform speed for the operative measuring stroke, and will thereafter have been brought back to its starting position.

It will be appreciated that the foregoing arrangements have been described by way of example only and may be modified in various ways within the scope of the invention. Thus, for example, instead of providing a separate circular plate for each size and shape of ball or roller or other test body, a single plate may be provided with a series of seating orifices of different sizes and shapes with mounting means on the top plate to enable any of such orifices to be brought accurately into the operative position above the stylus. Alternatively, a single plate may be used having three lands radially adjustable with respect to a fixed centre to provide three-point support for balls within a range of different diameters, and similarly a plate having two bars or pairs of lands relatively adjustable towards or away from one another could be used for receiving cylindrical rollers within a range of different diameters.

What we claim as our invention and desire to secure by Letters Patent is:

1. An attachment for adapting to the testing of a surface of revolution of small radius on a test body a main apparatus for indicating the roughness of a surface, said main apparatus being of the kind comprising drive means for linearly traversing over a test surface a pick-up head which produces an electrical output indicative of the roughness of said surface together with an electrical measuring or indicating instrument electrically connected to and controlled by the electrical output of the pick-up head, said attachment comprising in combination a supporting framework, a stationary plate detachably mounted on the framework and having an orifice, a seating for a test body in such orifice whereby a portion of the surface of the test body is exposed through the orifice to the reverse side thereof, a stylus for engaging with such exposed portion of the test surface, means whereby the stylus is movably mounted on the framework, a friction pad for engaging with the surface of the test body opposite said stylus, an arm carrying the friction pad, a member to which such arm is pivoted, means whereby such member can be coupled in place of said pick-up head to the drive means of the main apparatus whereby the friction pad is linearly driven by said drive means and is thereby caused to exert a frictional force which rotates the test body on its seating, thus causing a circular section of the test surface to be traversed past the stylus, whereby such stylus is caused to perform small working movements in an approximately radial direction relatively to the axis of rotation of the test body in accordance with the roughness of the test surface, a transducer in the framework responsive to the working movements of the stylus, and means for coupling the transducer to the measuring or indicating instrument of the main apparatus to control said instrument in accordance with the electrical output of the transducer.

2. Measuring or indicating apparatus as claimed in claim 1, in which the mounting means for the stylus comprises a substitute pick-up head carrying the transducer and pivotally mounted in the framework, means for pivoting the stylus to the substitute pick-up head, a stop adjustably mounted on the framework, an abutment on the substitute pick-up head, and spring means for urging the abutment into engagement with such stop, the stop constituting a reference datum for the working movements of the stylus.

3. Measuring or indicating apparatus as claimed in claim 2, including a micrometer screw, and a lever having a large reduction ratio for transmitting movement from such micrometer screw to the stop, for affording fine adjustment of the stop position.

4. Measuring or indicating apparatus as claimed in claim 2, in which the supporting framework is constituted by a box having a top-plate to which the substitute pick-up head is pivoted and on which the plate containing the seating orifice rests, stops on the top-plate for accurately determining the operative position of such orifice plate, and means for clamping the orifice plate to the top-plate in its operative position.

5. Measuring or indicating apparatus as claimed in claim 1, in which the supporting framework includes a top-plate on which the plate containing the seating orifice can slide, stops on the top-plate for accurately determining the operative position of such orifice plate, and means for clamping the orifice plate to the top-plate in its operative stationary position.

References Cited in the file of this patent
UNITED STATES PATENTS

| | | |
|---|---|---|
| 2,491,016 | Reason | Dec. 13, 1949 |
| 2,700,889 | Young | Feb. 1, 1955 |
| 2,778,497 | Bickley | Jan. 22, 1957 |
| 2,972,250 | Reason | Feb. 21, 1961 |

UNITED STATES PATENT OFFICE
CERTIFICATE OF CORRECTION

Patent No. 3,158,022 November 24, 1964

George Ormerod Rawstron et al.

It is hereby certified that error appears in the above numbered patent requiring correction and that the said Letters Patent should read as corrected below.

In the grant, lines 4 and 15, and in the heading to the printed specification, line 7, for "Holson", each occurrence, read -- Hobson --.

Signed and sealed this 6th day of April 1965.

(SEAL)
Attest:

ERNEST W. SWIDER
Attesting Officer

EDWARD J. BRENNER
Commissioner of Patents